United States Patent
Nagao et al.

(10) Patent No.: US 12,128,914 B2
(45) Date of Patent: Oct. 29, 2024

(54) POLICY MANAGED VEHICLE OPERATION SYSTEMS AND METHODS

(71) Applicant: Intertrust Technologies Corporation, Sunnyvale, CA (US)

(72) Inventors: Yutaka Nagao, San Jose, CA (US); Michael Manente, Sudbury, MA (US)

(73) Assignee: Intertrust Technologies Corporation, Sunnyvale, CA (US)

(*) Notice: Subject to any disclaimer, the term of this patent is extended or adjusted under 35 U.S.C. 154(b) by 439 days.

(21) Appl. No.: 17/200,441

(22) Filed: Mar. 12, 2021

(65) Prior Publication Data

US 2021/0362735 A1   Nov. 25, 2021

Related U.S. Application Data

(60) Provisional application No. 63/027,792, filed on May 20, 2020.

(51) Int. Cl.
*B60W 50/10* (2012.01)
*B60W 50/12* (2012.01)
*B60W 60/00* (2020.01)
*H04L 9/32* (2006.01)

(52) U.S. Cl.
CPC ............ *B60W 50/10* (2013.01); *B60W 50/12* (2013.01); *B60W 60/00188* (2020.02); *H04L 9/3247* (2013.01)

(58) Field of Classification Search
CPC ................. B60W 50/10; B60W 50/12; B60W 60/00188; B60W 2540/045; B60W 2556/45; B60W 60/0015; H04L 9/3247; H04L 9/3263

USPC .......................................................... 701/36
See application file for complete search history.

(56) References Cited

U.S. PATENT DOCUMENTS

| | | |
|---|---|---|
| 10,103,889 B2 | 10/2018 | Bronk |
| 10,124,750 B2 | 11/2018 | Markham |
| 10,447,483 B1 | 10/2019 | Su |
| 10,505,917 B2 * | 12/2019 | Chhabra ............... H04L 63/061 |

(Continued)

FOREIGN PATENT DOCUMENTS

| | | | | |
|---|---|---|---|---|
| CN | 107919955 A | * | 4/2018 | ........... H04L 9/0825 |
| RS | 20120407 A1 | * | 4/2014 | |

OTHER PUBLICATIONS

Autonomous Vehicle: Security by Design. Chattopadhyay et al. IEEE Transactions on Intelligent Transportation Systems. Submitted for publication Oct. 1, 2018. (11 pgs).

*Primary Examiner* — Jelani A Smith
*Assistant Examiner* — George A Alcorn, III
(74) *Attorney, Agent, or Firm* — John P. Davis; Thayne and Davis LLC

(57) ABSTRACT

This disclosure relates to, among other things, managing the operation of a vehicle in accordance with one or more policies. Consistent with various aspects of the disclosed embodiments, a vehicle control system may be used to enforce policy in connection with various vehicle operations based, at least in part, on trusted information provided by one or more vehicle subsystems and/or other systems. A vehicle control system may verify the received information and use the verified information to determine whether the vehicle may engage in a particular operation and/or enter a particular operational mode in accordance with one or more policies.

15 Claims, 4 Drawing Sheets

(56) References Cited

U.S. PATENT DOCUMENTS

| | | | |
|---|---|---|---|
| 11,228,880 B2* | 1/2022 | Aldana | H04W 8/005 |
| 11,381,585 B2* | 7/2022 | Kim | H04W 80/02 |
| 11,392,690 B2* | 7/2022 | Hung | G06F 21/554 |
| 11,495,126 B2* | 11/2022 | Ding | G08G 1/0116 |
| 2008/0238690 A1* | 10/2008 | Plant | G07C 9/27 340/573.1 |
| 2018/0006829 A1* | 1/2018 | Kravitz | H04W 12/06 |
| 2019/0166494 A1* | 5/2019 | Poplawsky | B60R 25/33 |
| 2019/0238555 A1* | 8/2019 | Buffard | H04L 63/0823 |
| 2019/0296919 A1* | 9/2019 | Kravitz | H04L 9/3255 |
| 2020/0162449 A1 | 5/2020 | Nagao | |
| 2020/0211301 A1* | 7/2020 | Zhang | H04L 63/065 |
| 2020/0213287 A1 | 7/2020 | Zhang et al. | |
| 2020/0274851 A1 | 8/2020 | Qiao et al. | |

* cited by examiner

POLICY MANAGED VEHICLE OPERATION SYSTEMS AND METHODS

RELATED APPLICATION

This application claims the benefit of priority under 35 U.S.C. § 119(e) to U.S. Provisional Patent Application No. 63/027,792, filed May 20, 2020, and entitled "SYSTEMS AND METHODS FOR SECURE COMMUNICATION IN AUTONOMOUS VEHICLES," the contents which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for securely managing the operation of vehicles. More specifically, the present disclosure relates to systems and methods for managing certain autonomous and/or other assisted driving operations of vehicles in accordance with one or more articulated policies.

Vehicles are progressively incorporating autonomous operation and assisted driving technologies and functionality. When a vehicle, such as a passenger car, engages in more sophisticated autonomous or driver-assist actions such as, for example, autonomous and/or semi-autonomous driving, assisted parking, lane tracking, and/or the like, the vehicle may use information obtained by a variety of vehicle components and/or subsystems. For example, decisions relating to autonomous and/or driver-assist control actions may use information received from camera sensors, light sensors, light detection and ranging ("LIDAR") sensors, radio detection and ranging ("RADAR"), global positioning system ("GPS") and/or other location sensors, information received via an Internet and/or other network connections, locally stored database information, and/or the like.

Vehicle subsystems involved in autonomous and/or driver-assist operations are typically physically connected. For example, in conventional vehicles, many vehicle subsystems including microcontrollers, sensor systems, network interfaces, engine and vehicle control modules, electronic control units ("ECUs"), and/or the like, may be communicatively interconnected using a controller area network ("CAN") bus. This physical interconnection may limit the information that may be exchanged between various subsystems, and may not provide the flexibility of more sophisticated network connection technologies including wireless network connection technologies (e.g., WiFi).

Many vehicle subsystems are progressively being equipped with more sophisticated software updating capabilities. This may enable a vehicle control program such as, for example and without limitation, an autonomous driving and/or assisted driving control program, to send control commands to vehicle subsystems and to monitor more detailed information associated with the subsystems. This more detailed information may include, for example and without limitation, subsystem manufacturer information, device type information, software version information, subsystem status information, and/or the like. Consistent with embodiments disclosed herein, using such information, a vehicle control system may engage in policy management and/or control decisions that help ensure that a vehicle may safely engage in an autonomous and/or assisted driving control action.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Consistent with various aspects of the disclosed embodiments, a vehicle control system may be used to enforce policy in connection with various vehicle operations based, at least in part, on trusted information provided by one or more vehicle subsystems and/or other systems. For example, in some embodiments, status and/or other system information provided by one or more vehicle subsystems may be cryptographically signed and/or otherwise associated with a trusted credential. A vehicle control system may verify the received status and/or system information and use the verified information to determine whether the vehicle may engage in a particular operation and/or enter a particular operational mode in accordance with one or more policies.

In further embodiments, one or more other systems and/or devices, which may be separate from the vehicle (e.g., policy services, mobile devices, and/or data and/or other information services), may provide information used in connection with policy enforcement decisions performed by the vehicle control system.

Vehicle Policy Management Architecture

Figure 1:
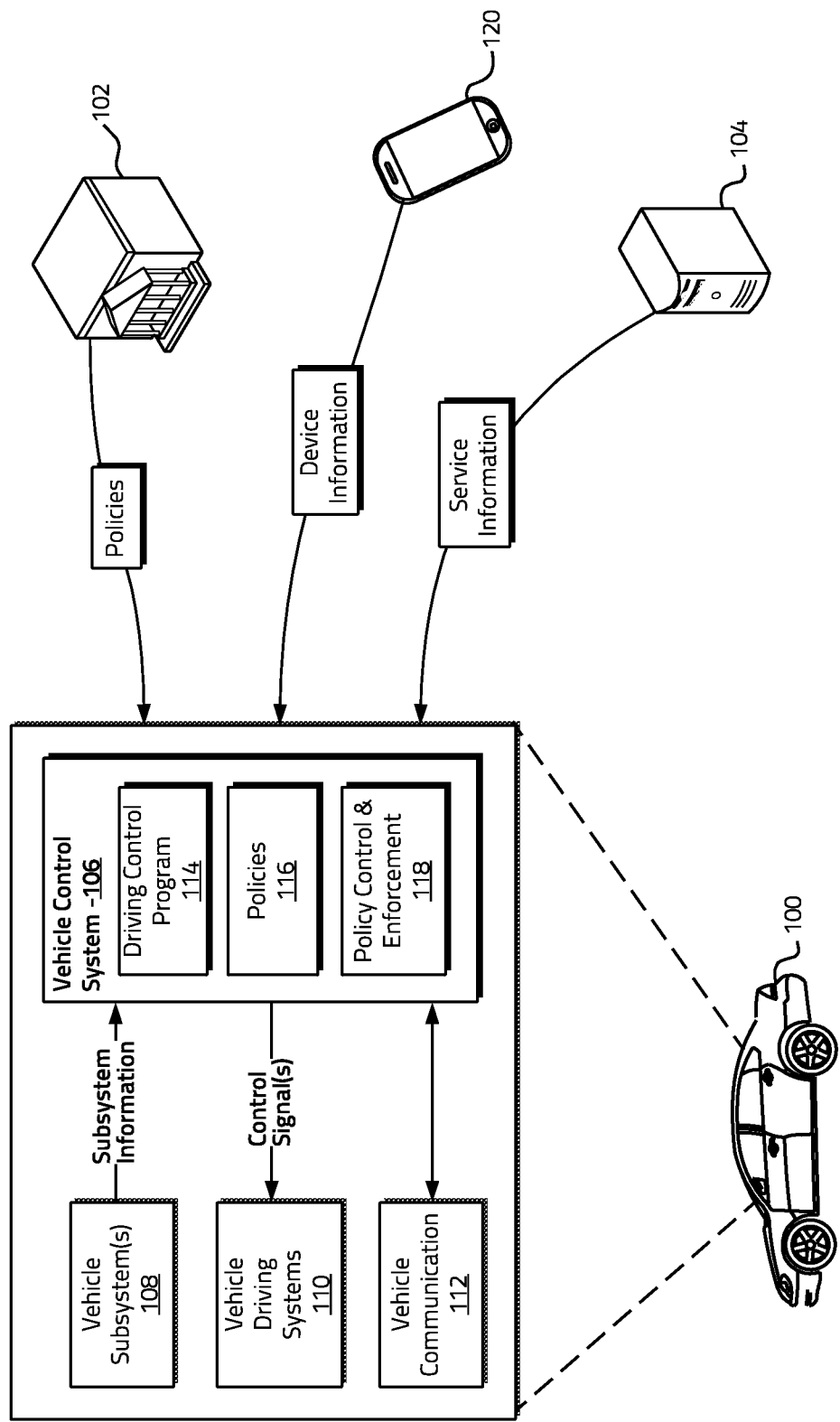
FIG. 1 illustrates an example of a vehicle operation policy management architecture consistent with certain embodiments of the present disclosure.

FIG. 1 illustrates an example of a vehicle operation policy management architecture consistent with certain embodiments of the present disclosure. The vehicle 100 may comprise a passenger vehicle, such as a car, a truck, a van, and/or the like, a transit vehicle, a train, light rail, and/or monorail vehicle, a watercraft, an aircraft, a freight vehicle, any/or any other type of that may be used to implement various embodiments of the disclosed systems and methods. In various examples described herein, for purposes of explanation, embodiments of the disclosed systems and methods may be described as being used in connection with a vehicle 100 capable of autonomous operation. It will be appreciated, however, that embodiments of the disclosed systems and methods are not so limited and may be incorporated in vehicles that engage in autonomous operation, semi-autonomous operation, driver-assisted operation (e.g., lane tracking and/or the like), and/or vehicles that do not incorporate such features but nevertheless include a variety of vehicle subsystems and engage in certain vehicle control actions based on information generated by and/or received from such subsystems.

Various operations of the vehicle may be controlled by one or more control systems 106. Although various embodiments and examples shown here are described in connection with a single control system 106 configured to control various vehicle driving operations, it will be appreciated that embodiments of the disclosed systems and methods may be used in connection with multiple vehicle control systems, which may engage in coordinated operation, and/or a variety of different vehicle control systems controlling a variety of vehicle functions that may, or may not, involve vehicle driving control.

As used herein, a vehicle control system 106 may comprise any computing system, processor, and/or logic system included in a vehicle 100 and/or any embedded systems that controls one or more systems and/or subsystems in a vehicle 100. For example, a vehicle control system 106 may execute a driving control program 114 that may be configured to control one or more vehicle driving systems 110 (e.g., vehicle drivetrain systems and/or associated components) and/or associated subsystems via one or more control signals issued by the vehicle control system 106.

In some embodiments, the vehicle control system 106 may comprise an Electronic Control Unit ("ECU"). Various aspects of the disclose embodiments may be implemented in connection with a variety of vehicle control systems 106 including, for example and without limitation, autonomous, semi-autonomous, and/or driver assist control modules, electronic and/or engine control modules ("ECMs"), brake control modules ("BCMs" or "EBCMs"), transmission control modules and/or units ("TCMs" or "TCUs"), powertrain control modules ("PCMs"), central timing modules ("CTMs"), convenience control units ("CCUs"), general electronic modules ("GEMs"), suspension control modules ("SCMs"), central control modules ("CCMs"), electric power steering control units ("PSCU"), speed control units ("SCUs"), door control units ("DCUs"), infotainment systems, telematics systems and/or associated control units, and/or the like.

Any function of the vehicle 100 may be monitored and/or controlled by a vehicle control system 106 and/or an associated system. In some embodiments, certain vehicle control systems 106 included in a vehicle 100 may be associated with and/or otherwise communicate with one or more vehicle subsystems 108. In certain embodiments, the one or more vehicle subsystems 108 may comprise one or more sensor systems configured to measure and/or otherwise provide operating, status, and/or other parameters related to the subsystems 108 and/or the vehicle 100 to the vehicle control system 106. A vehicle control system 106 may be configured to provide control signals and/or status information to other vehicle control systems, and correspondingly to respond to control signals and status information provided by other vehicle control systems.

In various embodiments, the vehicle control system 106 may interface with one or more policy service systems 102, devices 120 that may include mobile devices (e.g., smartphones, tablets, and/or other devices that in some instances, may be associated with a particular user), and/or service providers 104. In certain embodiments, the vehicle control system 106, policy service systems 102, service providers 104, and/or devices 120, and/or any other related device, service, and/or system may comprise one or more computing and/or processing devices, systems, and/or subsystems, including any processing and/or computing system suitable to implement various embodiments of the systems and methods disclosed herein. For example, the policy service systems 102, service providers 104, and/or devices 120 may comprise a variety of computing devices and systems, including laptop computer systems, desktop computer systems, server computer systems, microcomputing systems, distributed computer systems, smartphones and/or other mobile devices, tablet computers, and/or the like.

In certain embodiments, the vehicle control system 106, policy service systems 102, service providers 104, and/or devices 120, and/or any other related device, service, and/or system may comprise at least one processor system configured to execute instructions stored on an associated non-transitory computer-readable storage medium. As discussed in more detail below, the vehicle control system 106, policy service systems 102, service providers 104, and/or devices 120, and/or any other related device, service, and/or system may further comprise a secure processing unit ("SPU") configured to certain perform sensitive operations such as trusted credential and/or key management, user information management, digital signature and/or other cryptographic operations, secure policy management, and/or other aspects of the systems and methods disclosed herein. The vehicle control system 106, policy service systems 102, service providers 104, and/or devices 120, and/or any other related device, service, and/or system may further comprise software and/or hardware configured to enable electronic communication of information between the devices, services, and/or systems via one or more networks using any suitable communication technology and/or standard.

The vehicle control system 106, policy service systems 102, service providers 104, and/or devices 120, and/or any other related device, service, and/or system may be communicatively coupled using a variety of networks and/or network connections. In certain embodiments, the network may comprise a variety of network communication devices and/or channels, and may utilize any suitable communications protocols and/or standards facilitating communication between the vehicle control system 106 and/or other systems and/or subsystems of the vehicle 100, policy service systems 102, service providers 104, and/or devices 120, and/or any other related device, service, and/or system.

In some embodiments, the network may comprise the Internet, a local area network, a virtual private network, a CAN network facilitating interconnection via a vehicle CAN bus, and/or any other communication network utilizing one or more electronic communication technologies and/or standards (e.g., Ethernet or the like). For example, the network may comprise a CAN bus network configured to communicatively couple a vehicle control system 106 with a vehicle subsystem 108. In further embodiments, the network may comprise a wireless network configured to communicatively couple various vehicle control systems 108, vehicle subsystems 108, vehicle driving systems 110, and/or other vehicle systems and/or subsystems.

In certain embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In some embodiments, the network may incorporate one or more satellite communication links. In yet further embodiments, the network may utilize IEEE's 802.11 standards, Bluetooth ultra-wide band ("UWB"), Zigbee®, and or any other suitable standard or standards.

As discussed above, in some embodiments, various systems and/or subsystems of the vehicle 100 may be interconnected via one or more CAN busses included in the vehicle 100. For example, as illustrated, the vehicle control system 106 may be interconnected with vehicle subsystems 108, vehicle driving systems 110 (e.g., drivetrain and/or other driving related components and/or subsystem), a vehicle communication subsystem 112, and/or other vehicle systems and/or subsystems via a CAN bus, although other suitable methods and/or architectures facilitating communicative interconnection between various vehicle 100 systems and/or subsystems may also be used. In some embodiments, the vehicle 100, vehicle subsystems 108, vehicle driving systems 110, and/or vehicle control system 106, and/or other vehicle systems and/or subsystems may communicate with services, and/or devices separate from the vehicle 110 (e.g., policy service systems 102, service providers 104, and/or devices 120) using the vehicle communication subsystem 112 via any suitable network connection(s).

A vehicle 100 may include a variety of subsystems 108. For example and without limitation, a vehicle 100 may comprise one or more lighting subsystems, braking subsystems, steering subsystems, suspension subsystems, drivetrain subsystems, camera subsystems, network interfaces and subsystems, microcontrollers, sensor systems (e.g., camera sensors, LIDAR sensors, RADAR sensors, GPS and/or other location sensors, etc.), engine and vehicle control modules, and/or any other type of vehicle subsystems and/or components. The operation of the vehicle 100 and/or various vehicle systems and/or subsystems 108 may depend, at least in part, on information received from one or more vehicle subsystems 108. For example, in various embodiments, policy enforced control decisions relating to autonomous, semi-autonomous, and/or assisted driving control actions and/or operational modes may be based, at least in part, on information received from one or more vehicle subsystems 108.

In various embodiments, vehicle subsystems 108 may generate and/or communicate subsystem information to one or more vehicle components, systems, other subsystems, and/or vehicle control systems 106. For example, in some embodiments, vehicle sensors may communicate sensor generated and/or measurement information to the vehicle control system 106. In further embodiments, subsystem information communicated from vehicle subsystems 108 may comprise information relating to the associated subsystem 108 (e.g., subsystem identification information, manufacturer information, model information, serial number information, software version information and/or the like).

In some embodiments, one or more vehicle subsystems 108 may be associated with a trusted certificate and/or other trusted credential that may include information relating to the associated subsystem 108. In some embodiments, this information may be relatively static in nature and/or not change frequently such as, for example and without limitation, information relating a subsystem's manufacturer, model, serial number, and/or type. In further embodiments, this information may be more dynamic in nature and/or otherwise change over time such as, for example, software version information associated with a subsystem (e.g., major, minor version information).

One or more vehicle subsystems 108 may be further associated with a cryptographic key (e.g., a private key) that may be used in signature generation operations. In various embodiments, the private key may be securely stored by a vehicle subsystem 108. In certain embodiments, subsystem information generated by the vehicle subsystem 108 may be digitally signed using the private key.

In various embodiments, subsystem information provided from a vehicle subsystem 108 may comprise and/or otherwise be associated with a trusted certificate securely associated with the subsystem 108 and/or a digital signature generated using a private cryptographic key securely associated with the subsystem 108. As described in more detail below, in some embodiments, a system receiving the subsystem information (e.g., control system 106) may verify the information included in the trusted certificate and/or the digital signature, potentially interacting with a separate policy validation and/or authentication service provider (e.g., service provider system 104). In this manner, the control system 106 may verify the authenticity of the information received from a subsystem 108 and/or associated characteristics of the subsystem 108.

Consistent with embodiments of the disclosed systems and methods, a vehicle control system 106 in communication with the subsystems 108 may engage in certain vehicle control operations based on information received from the subsystems 108 in accordance with one or more specified policies 116. In some embodiments, this functionality may be implemented, at least in part, by a driving control program 114 and/or a policy control and enforcement module 118 executing on the vehicle control system 106. Although illustrated as two separate modules, it will be appreciated that in certain embodiments, functionality of the driving control program 114 and the policy control and enforcement module 118 may be included in a single module and/or implemented by any suitable number of executable modules (which may or may not necessarily be executed by the vehicle control system 106).

In various examples described herein, the driving control program 114 may comprise an autonomous driving operation control program, although other types of control programs are also contemplated. For example, it will be appreciated that the driving control program may also comprise a semi-autonomous driving control program, an assisted driving control program, and/or any other suitable type of control program managing the operation of one or more vehicle functions.

In certain embodiments, the vehicle control system 106 may be provisioned with one or more policies 116, which in certain instances herein may be referred to as digital rights management ("DRM") licenses. Policies may be provisioned to the vehicle control system 106 in a variety of ways including, for example and without limitation, by a policy service provider 102. As discussed in more detail below, in certain embodiments, the policy service provider 102 may be capable of pushing new and/or updated policies 116 to the vehicle control system 106 for enforcement by the driving control program 114 and/or an associated policy control and/or enforcement module 118. In further embodiments, the vehicle control system 106 may retrieve (e.g., retrieve periodically, semi-periodically, based on the occurrence of particular events, and/or the like) any applicable policies 116 from the policy service provider 102.

Consistent with various disclosed embodiments, vehicle control actions, coordinated vehicle control actions, and/or vehicle operational modes may be associated with a policy 116. For example, a policy 116 may be associated with an autonomous parking control operation, freeway autonomous driving operations, municipal roadway driver-assist operations, and/or the like. In further examples, a policy 116 may be associated with an autonomous driving operating mode, a semi-autonomous driving operating mode, a driver-assist operating mode, and/or the like.

In some embodiments, policies 116 may be secure and/or otherwise trusted. For example, a policy 116 may be digitally signed by an associated source (e.g., by the policy service provider 102). The vehicle control system 106 and/or the driving control program 114 and/or policy control and/or enforcement module 118 may validate the signature to authenticate the policy 116 before it is enforced, potentially interacting with a policy validation service and/or other trusted service in connection with the validation and/or authentication process.

Consistent with various embodiments, a policy 116 may be evaluated by the driving control program 114 and/or an associated policy control and/or enforcement module 118 in connection with determining whether the driving control program 114 should engage in an associated control action, a set of coordinated vehicle control actions, and/or a vehicle operational mode. If various rules, requirements, and/or conditions expressed and/or otherwise specified in connection with the policy 116 are satisfied, the driving control program 114 may issue one or more control signals to associated vehicle systems (e.g., a vehicle driving system 110 such as a powertrain system) to engage in the specified action, coordinated actions, and/or operational mode.

In certain embodiments, policy determinations by the driving control program 114 and/or an associated policy control and/or enforcement module 118 may be made based, at least in part, on subsystem information provided by one or more vehicle subsystems 108. In further embodiments, policy determinations by the driving control program 114 and/or an associated policy control and/or enforcement module 118 may be made based on information received from one or more devices 120 and/or service providers 104.

In at least one non-limiting example, one or more user devices 120 may communicate driver authentication and/or identification information to the vehicle 100 providing information regarding an associated user, functioning as a sort of digital driver's license. The driving control program 114 and/or an associated policy control and/or enforcement module 118 may verify the received driver authentication and/or identification information with a service provider system 104 providing driver authentication and privileged verification services and, based on a received response, may determine whether the vehicle 100 may engage in a control action, a set of coordinated control actions, enter a particular operating mode, and/or the like. For example, the vehicle control system 106 may issue one or more control signals to the vehicle driving systems 110 based on the policy determination.

Although the vehicle driving systems 110 and the vehicle subsystems 108 are separately illustrated, it will be appreciated that in some embodiments, a system controlled by the vehicle control system 106 (e.g., vehicle driving systems 110) may also provide subsystem and/or other information to the vehicle control system 106 that may be used in connection with policy enforcement determinations.

In at least one non-limiting example, a policy associated with an autonomous parking operation for vehicle 100 may include the following rules and/or conditions:

Rule 1: a rear camera sensor needs to meet the following conditions:
Manufacturer needs to be 'A'
Model needs to be 'B'
Type needs to be 'C'
Firmware version at the sensor needs to be greater than 'D'
Status needs to be 'E' or 'F'

Rule 2: a rear light needs to meet the following conditions:
Manufacturer needs to be 'G'
Model needs to be 'H'
Type needs to be 'I'
Firmware version needs to be greater than 'J'
Status needs to be 'K' or 'L'

If the conditions of Rules 1 and 2 are met, then the control system 106 may allow the autonomous parking operation to proceed.

In certain embodiments, policies may be applicable to a particular geographic area. For example, a policy may specify that when the vehicle is within a certain geographic region such as a state or municipality, the vehicle should not engage in fully autonomous operation due to local laws and/or regulations.

In further embodiments, policies may be applicable to particular conditions surrounding the vehicle 100. For example, a policy may specify that when the vehicle is in an area experiencing increased traffic congestion and/or heavy rain and/or snowfall, the vehicle 100 should not engage in autonomous operation and/or operation above certain speeds. Information used in such a policy enforced determination may be provided by vehicle subsystems 108 (e.g., local weather sensors) and/or a service provider 104 providing traffic and/or weather information to the vehicle 100.

In various embodiments, policies may be digitally signed by one or more trusted authorities that, in some instances, may comprise a source of the policy. For example and without limitation, a policy may be signed by an associated vehicle and/or vehicle system, subsystem, and/or component manufacturer, national and/or international standards organizations, safety and/or other regulatory authorities, registration and/or certification authorities, and/or the like.

A vehicle control system 106 may be provisioned with secure keys and/or certificates that may be used to validate and/or otherwise authenticate policy signatures prior to enforcing such policies. In further embodiments, the vehicle control system 106 may interact with one or more separate policy validation and/or authentication service providers (e.g., service provider system 104). By validating and/or otherwise authenticating policy signatures, the vehicle control system 106 may protect itself from potentially fraudulent, unsafe and/or unauthentic policies, policies that have been tampered with, expired, superseded, or otherwise modified, and/or the like.

In some embodiments, the contents of policies may be encrypted and/or otherwise encoded in such a way to make the policy content details and/or use of the policy contents available only to systems that have been authorized or provisioned with suitable decryption keys. In such a manner, observers of a policy update and/or provisioning process may be less able to filter and/or otherwise interfere with the update and/or provisioning of policies (e.g., by interfering with an updated policy that removes access to a feature that should be disabled for safety reasons). In various embodiments, keys associated with validating, authenticating, and/or decrypting secure policies may be stored in a secure processing environment and/or secure processing hardware associated with the vehicle control system 106. For example, keys may be stored by a secure processing environment and/or secure processing hardware in a manner that permits the use of the keys by the vehicle control system 106 but resists tampering with and/or unauthorized access to the keys from other vehicle systems, subsystems, and/or components, vehicle users, vehicle service personnel and/or software, malicious software, and/or the like.

It will be appreciated that a wide variety of applicable policies articulating a wide variety of associated requirement may be used in connection with various disclosed embodiments, and that any suitable policy articulating any associated requirement may be implemented in connection with the embodiments disclosed herein.

Vehicle Operation Policy Enforcement Example

Figure 2:
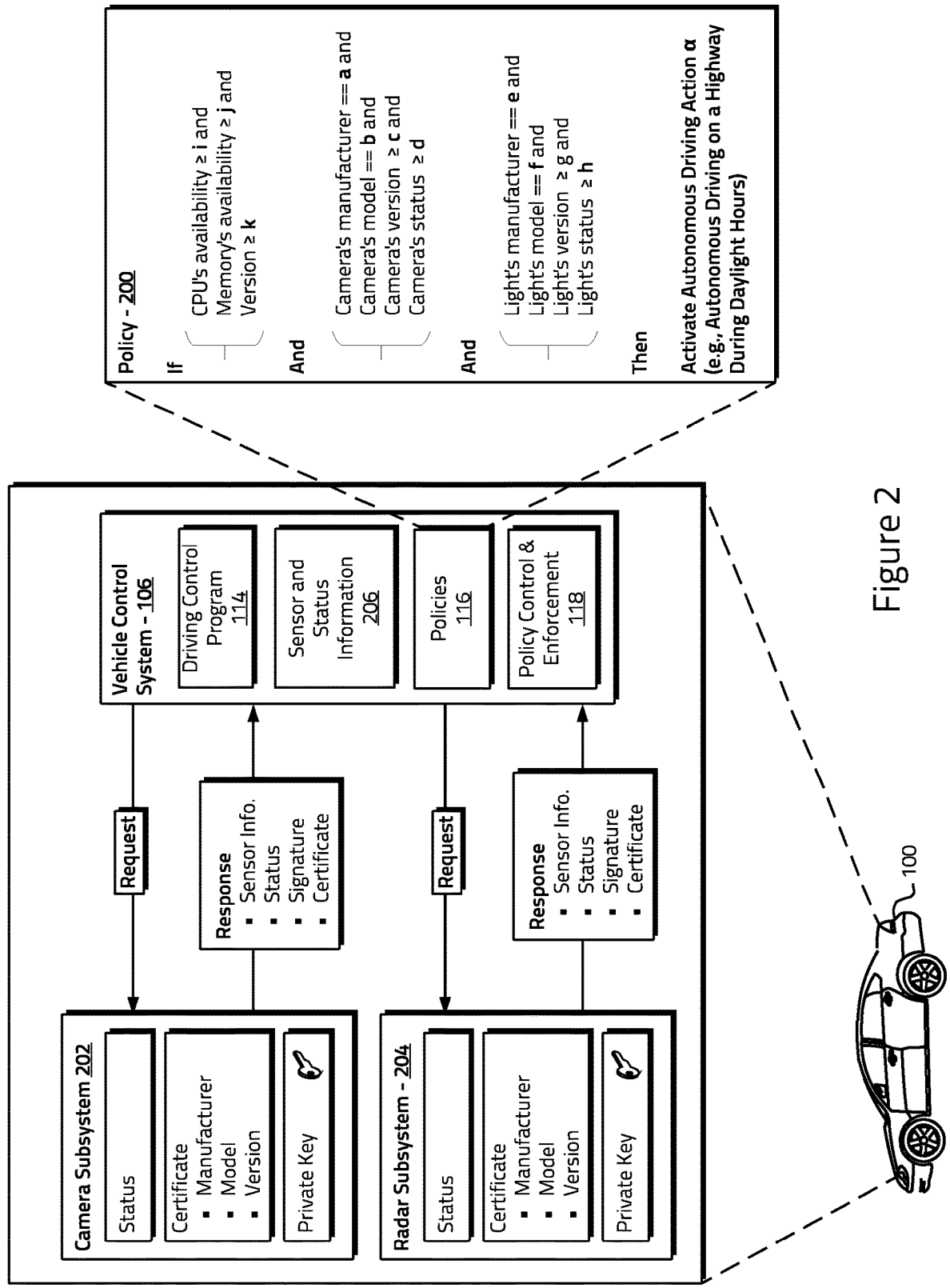
FIG. 2 illustrates an example of vehicle operation policy enforcement consistent with certain embodiments of the present disclosure.

FIG. 2 illustrates a non-limiting example of vehicle operation policy enforcement consistent with certain embodiments of the present disclosure. In the illustrated example, a vehicle 100 may comprise a camera subsystem 202 and a light subsystem 204 (e.g., a light detection subsystem configured to detect ambient light surrounding the vehicle). The camera and/or light subsystems 202, 204 may generate a variety of sensor information. For example, the camera subsystem 202 may generate image information obtained by the camera subsystem 202. The light subsystem may generate information relating to a current brightness level in an environment surrounding the vehicle 100 and/or information relating to vehicle driving conditions (e.g., bright, cloudy, nighttime, and/or the like).

The camera subsystem 202 may be associated with and/or store a trusted credential comprising information indicating the camera subsystem's manufacturer, the camera subsystem's model, camera subsystem software version information, and/or the like. The camera subsystem 202 may further securely store an associated private key that may be used in connection with cryptographic signing operations.

Similarly, the light subsystem 204 may be associated with and/or store a trusted credential including information indicating the light subsystem's manufacturer, the light subsystem's model, light subsystem software version information, and/or the like. The light subsystem 204 may further securely store an associated private key that may be used in connection with cryptographic signing operations.

The camera subsystem and/or light subsystem 202, 204 may each generate associated status information. In at least one non-limiting example, a subsystem 202, 204 may generate status information relating to its operational capability, sensitivity, and/or associated subsystem functionality problems and/or issues (e.g., error codes or the like). For example, the camera subsystem 202 may generate status information indicating that its current sensitivity is 80% of normal operating sensitivity, its color phase detection is no longer operating as expected, and/or the like. Similarly, the light subsystem 204 may generate an error code indicating it has been occluded and cannot accurately determine the current brightness level of an environment surrounding the vehicle 100.

In some embodiments, the sensor and/or status information may comprise a timestamp indicating when the associated signal information was generated, current hardware and/or software conditions associated with the camera and/or light subsystem 202, 204, and/or the like.

The sensor information, status information, a signature generated using a private cryptographic key of an associated subsystem, and/or a trusted certificate may be communicated from the applicable subsystems 202, 204 to the vehicle control system 106. In some embodiments, the information may be communicated to the vehicle control system 106 in response to requests issued by the vehicle control system 106 and/or an associated driving control program and/or policy control and/or enforcement module 118 executing on the vehicle control system 106. For example, when a particular vehicle control action implicating one or more policies 116 is being evaluated (e.g., entering an autonomous driving mode and/or the like), the vehicle control system 106 may issue one or more requests to associated subsystems 202, 204 for information used in policy enforcement determinations. In further embodiments, subsystems 202, 204 may push the information to the vehicle control system 106 continuously, periodically, and/or when there are updates and/or changes to the information. In some embodiments, the vehicle control system 106 may store received sensor and/or status information 206 and/or any associated signatures and/or trusted certificates for future policy enforcement determinations and/or diagnostic purposes.

In some embodiments, a signature communicated from the subsystems 202, 204 may comprise a signature over the sensor and/or status information and/or portions thereof generated using the private key of the associated subsystem 202, 204. The trusted certificate may include various information relating to the subsystems 202, 204 such as, for example and without limitation, manufacturer, model, software and/or hardware version information, and/or the like. In some embodiments, the trusted certificate may be securely associated with the private key used to generate the signature.

Consistent with various embodiments disclosed herein, using information received from the subsystems 202, 204, the vehicle control system 106 and/or a driving control program 114 and/or policy control and/or enforcement module 118 executing thereon may engage in policy management and/or control decisions based on various rules, requirements, and/or conditions specified in one or more applicable policies 116 to help ensure that the vehicle may safely engage in a particular control action. For example, as illustrated in FIG. 2, a policy 116, a policy may articulate that to engage in autonomous operation a, the following illustrative example rules and/or associated conditions may need to be met:

Rule 1: the control system needs to meet the following conditions:
CPU availability needs to be $\geq i$
Memory availability needs to be $\geq j$
Version number needs to be $\geq k$ Rule 2: a camera subsystem needs to meet the following conditions:
Camera manufacturer needs to be==a
Camera model number needs to be==b
Camera's software version needs to be $\geq c$
Camera's status needs to be $\geq d$ Rule 3: a light subsystem needs to meet the following conditions:
Light manufacturer needs to be==e
Light model number needs to be==f
Light's software version needs to be $\geq g$
Light's sensor information needs to be $\geq h$ As shown in the illustrated example, in some embodiments, a vehicle control system 106 may request information from associated subsystems 202, 204 to use in connection with policy evaluation and/or determinations. For example, the driving control program 114 may issue a request to a camera subsystem 202 and/or light sensor 204 for information to be used in a control action policy determination decision.

In response to the received request, the camera subsystem 202 may transmit a response to the control system 106. The response may comprise, for example and without limitation, status information, a trusted certificate, and/or a signature generated using a private cryptographic key securely associated with the camera subsystem 202. In some embodiments, the status information may comprise a timestamp indicating when the associated signal information was generated, current hardware and/or software conditions associated with the camera subsystem 202, and/or the like. In some embodiments, the signature may comprise a signature over the status information generated using the private key of the camera subsystem 202. The trusted certificate may include various information relating to the camera subsystem 202 such as, for example, manufacturer, model, and/or software and/or hardware version information. In some embodiments, the trusted certificate may correspond to the private key used to generate the signature included in the response.

Similarly, the light subsystem 204 may communicate a response to the received request to the control system 106. The response may comprise, for example and without limitation, sensor information, a trusted certificate, and/or a signature generated using a private cryptographic key securely associated with the light subsystem 204. In some embodiments, the status information may comprise a timestamp indicating when the associated signal information was generated, current hardware and/or software conditions associated with the light subsystem 204, and/or the like. In some embodiments, the signature may comprise a signature over the status information generated using the private key of the light subsystem 204. The trusted certificate may include various information relating to the light subsystem 204 such as, for example, manufacturer, model, and/or software and/or hardware version information. In some embodiments, the trusted certificate may correspond to the private key used to generate the signature included in the response.

Upon receipt, the control system 106 and/or the associated driving control program 114 and/or policy control and/or enforcement module 118 may verify the signature associated with the response returned by the camera subsystem 202. If this signature verification is successful, information used in connection with a policy enforcement decision may be extracted from the response and compared against one or more rules and/or conditions associated with an applicable policy relating to the camera subsystem 202.

The control system 106 and/or the associated driving control program 114 and/or policy control and/or enforcement module 118 may similarly verify the signature associated with the response returned by the light subsystem 204. If this signature verification is successful, information used in connection with a policy enforcement decision may be extracted from the response and compared against one or more rules and/or conditions associated with an applicable policy relating to the light subsystem 202.

If the requirements, rules, and/or conditions of the applicable policy are satisfied in view of the received responses (and any other requirements, rules, and/or conditions associated with the vehicle control system 106), the associated control action may proceed. For example, if Rules 1-3 and their associated conditions articulated in the policy illustrated in FIG. 2 are satisfied, then the driving control program 114 and/or policy control and/or enforcement module 118 may allow the autonomous operation a to proceed, and the driving control program may engage in generating and issuing associated commands and/or control actions to appropriate vehicle systems and/or subsystems.

It will be appreciated that a number of variations can be made to the architecture, relationships, and examples presented in connection with FIG. 1 and FIG. 2 within the scope of the inventive body of work. For example, various systems, subsystems, and/or associated functionalities described above may be integrated into a single system, subsystem, and/or functional module, and/or any suitable combination of systems, subsystems, and/or functional modules in any suitable configuration. Thus, it will be appreciated that the architecture, relationships, and examples presented in connection with FIG. 1 and FIG. 2 are provided for purposes of illustration and explanation, and not limitation.

Embodiments of the disclosed systems and methods may be used in a variety of applications, contexts, and/or use cases, including, for example and without limitation, one or more of the following.

Safety Recall and Selective Feature Grounding

After observing a pattern of accident reports relating to an autonomous vehicle driving system, a vehicle manufacturer and/or other authority (e.g., a safety regulatory authority) may initiate investigations as to the root cause of the accidents. Until problems are identified, resolved, and/or otherwise limited, the vehicle manufacturer may wish to temporarily disable certain vehicle features out of an abundance of caution. Consistent with embodiments disclosed herein, the vehicle manufacturer and/or another policy service may communicate a policy to the vehicle preventing the vehicle from entering an autonomous operation mode and/or entering the autonomous operating mode under certain conditions (e.g., high speeds) until an update to the policy (e.g., an update rescinding the policy) has been received by the vehicle control system.

Among other things, selective safety recalls and/or feature grounding using various aspects of the disclosed embodiments may result in increased safety for drivers and others on the road, reduce liability for manufacturers, and provide time for manufacturers and/or other authorities to implement investigations and/or corrective actions. Various embodiments disclosed herein may further reduce costs and/or increase effectiveness of notifying vehicle owners and/or associated users of potential safety defects and/or selective recalls, allowing for the disabling of certain features and/or the operation of certain features in certain contexts (e.g., autonomous driving at highway speeds), while continuing to enable other features and/or the operation of other features in other contexts (e.g., autonomous parking assist functionality as slow speeds).

Component Recalls and/or Selective Disablement

In various embodiments, regular policy updates may be provided to a vehicle control system to refresh the rights to use certain vehicle features and/or operational modes and/or to disable certain features and/or operational modes if a particular vehicle component and/or operational feature and/or mode (e.g., subsystem and/or the like) is subject to a safety recall. For example, certain component models and/or serial numbers of vehicle sensor systems may be subject a safety recall. Policy updates may be communicated to a vehicle control system and enforced to prevent the vehicle from engaging in control actions relying on the recalled sensor systems until they are updated with components not subject to the recall. This may allow for a targeted recall of certain vehicle features, functions, and/or operational modes for certain impacted vehicles to be broadcast to an entire fleet of vehicles in the field, and for vehicles receiving the policy to selectively determine whether certain features are permitted or restricted based on the updated policy and to the extent that the vehicle includes impacted sensor serial number and/or model ranges.

Configuration Management

A vehicle manufacturer may improve various vehicle components and/or subsystems over time. For example, later production runs of a vehicle may include improved components that may correct for potential flaws in the ability of the vehicle to safely engage in autonomous operations in all contexts. Some vehicle components and/or subsystems may be upgraded in the field to improve vehicle capabilities, but such field updates may not by themselves resolve any safety flaws. For example, upgrading a sensor component may be backwards compatible with other components in the system and therefore be considered a valid replacement part. However, other components may not be able to take full advantage of the new sensor input, and therefore simply detecting the new component itself may not be sufficient to safely enable certain autonomous features.

Consistent with embodiments disclosed herein, a policy may dictate valid and/or otherwise certified combinations of components that may be required to enable certain vehicle features. This may, among other things, allow for vehicle manufacturers to issue replacement parts that can substitute for older components as technology progresses without creating safety issues, but vehicles may require proper configuration of a number of certified components to be able to use more advanced features (e.g., fully autonomous operation and/or the like).

Vehicle Driver Presence Failsafe Protections

Automated driving systems may implement a range of degrees of automated control from little to no automatic control of operations of the vehicle to fully autonomous operation. Implementing lower levels of automation (e.g., no automation such as Society of Automotive Engineers ("SAE")—Level 0) and higher levels of automation (e.g., full automation such as SAE Level 5) may present relatively lower degrees of safety risk if involved systems and/or subsystems are operating correctly. Intermediate levels of automation, however, may present unique safety challenges relating to driver attention and ability to intervene in vehicle control in safety critical situations. For example, intermediate autonomous functionality may require that a driver remain attentive to the driving environment and be able to rapidly assume control of the vehicle if the automated driving system encounters a difficult driving situation and/or is otherwise unable to continue safe autonomous control of the vehicle. In this manner, a driver may function as an essential "safety backup" component of an autonomous vehicle system.

Requiring a driver to remain attentive and able to rapidly assume control while also not being actively engaged in driving presents certain practical challenges. These challenges may be attributable to a variety of factors including, for example and without limitation, longer periods of driver inactivity punctuated by moments requiring situational awareness, unpredictable timing of when autonomous control will cease and driver intervention becomes necessary, and/or reckless drivers that do not sufficiently attempt to perform a backup safety role.

To help alleviate these issues, policies consistent with various disclosed embodiments may specify requirements that certain driver attributes should be provided to and/or validated by a vehicle control system before allowing the vehicle to engage in certain autonomous operations. In this manner, a driver and/or a device associated with the driver may operate as a sort of certified component of the vehicle.

In at least one non-limiting example, a policy enforced by a vehicle control system may require that certain information identifying a driver and/or associated certifications and/or rights be provided to the vehicle control system before allowing for certain autonomous operation and/or autonomous operation in particular contexts. For example, information indicating that a particular driver has successfully passed a vehicle operation certification course and/or training may be communicated to the vehicle control system.

In some embodiments, the information identifying the driver and/or associated certifications and/or rights may be provided by a discrete secure hardware device (e.g., a secure dongle that may be inserted into an interface and/or otherwise communicate wirelessly with the vehicle control system). In further embodiments, the information identifying the driver and/or associated certifications and/or rights may be provided by another device associated with the driver (e.g., a smartphone device in physical and/or wireless communication with the vehicle control system and/or the like). In certain embodiments, the vehicle control system may submit the information identifying the driver and/or associated certifications and/or rights to a trusted service provider (e.g., a law enforcement and/or licensing authority) for verification.

In some embodiments, these types of policy requirements may provide an increased level of safety in connection with certain autonomous vehicle operations. For example, if a driver has been found by law enforcement to be driving in an autonomous driving mode in a manner that does not permit them to readily take control of the vehicle (e.g., driving with eyes closed and/or not otherwise on the road, without hands on the steering wheel, sitting in a different seat, and/or the like), the driver may have certifications revoked. Verification of associated driver rights to engage in autonomous operations may prevent the driver from engaging in such operations. In this manner, the user's license to drive the vehicle may remain active, but the driver's ability to engage in a particular autonomous operation mode on the vehicle and/or other vehicles may be restricted (at least temporarily).

Authentication and/or verification of driver identification and/or rights and/or certification information may use a variety of suitable authentication methods and/or protocols. In some embodiments, as discussed above, such authentication and/or verification may involve communicating with a service provider offering secure authentication services. In some embodiments, users may authenticate their identity using devices equipped with biometric readers compliant with the FIDO2 authentication standard and/or WebAuthn standards.

Upon successful authentication, appropriate certificates may be provided to or downloaded by the vehicle control system to indicate that the driver is validly certified. Such requirements may be further specified by a vehicle's other policy requirements based on geographical information such as current driving location, location of vehicle registration, and/or the like. For example, policies may articulate that, based on a driver's certification, the driver may operate a vehicle in an autonomous operating mode in one state, but may require different and/or additional certifications to operate the vehicle in the autonomous operating mode in a different state.

Time Based Policies

In certain embodiments, policies may specify an expiration date and/or an expiration time. Expiration dates and/or times associated with policies may be based, for example and without limitation, on an absolute day, date, and/or time, an elapsed period and/or time, an elapsed time of vehicle operation, and/or the like. In some embodiments, a vehicle control system may implement a trusted time synchronization process, a battery backed trusted time source, and/or a network accessible trusted time source for use in connection with making time-based policy enforcement decisions.

Time based policies may be useful in a variety of contexts, applications, and/or use cases. For example and without limitation, time based policies may be used to ensure that vehicle control systems are required to be connected to trusted sources (e.g., connect periodically, on a certain date/time, after a particular number of operating hours, etc.) to refresh and/or download new policies and/or other information (e.g., driver certification and/or credential information) for autonomous driving mode functionality to continue. In this manner, manufacturers and/or safety authorities can ensure that vehicles with outdated components and/or component configurations that may have been subject to safety recalls may only permit certain autonomous functionality for limited periods, independent of whether a driver and/or vehicle owner has been notified of a potential safety issue.

Policy Update Distribution

Vehicle control systems may be notified of updated policies via a number of methods including, for example and without limitation, receiving responses from trusted policy services via cellular, Wi-Fi, satellite, and/or other wireless connections. In some embodiments, trusted policy services may push policy updates and/or associated notifications to vehicle control systems. In some embodiments, policies may be pushed to vehicle control systems via a wired and/or wireless communication channel when an associated vehicle visits a charging station, fueling station, and/or maintenance facility. In some embodiments, vehicle control systems may receive policy update information via wireless vehicle-to-vehicle ("V2V") communications, vehicle to infrastructure communications ("V2I"), and/or vehicle-to-everything communications ("V2X"). Policy update information may, in some embodiments, comprise notifications of latest policy versions, revoked policy versions, and/or the like.

When a vehicle control system receives notification that a policy has been superseded by a newer version and/or that an existing policy has been revoked, the system may temporarily disable a prior and/or revoked policy and/or certain automated driving features until a new, updated, and/or otherwise valid policy is received. In some embodiments, to avoid possible safety issues with sudden engagement and/or disablement of features, policies may be revoked and/or updated when the vehicle is not moving, when an associated operational mode and/or feature is not engaged, when the vehicle is restarted, after a suitable warning period, and/or the like. Vehicle control systems may contain predetermined rules governing activation of a newly received policy and/or or a policy itself may contain information governing its activation (e.g., immediately, after next disengagement of a feature, at the next stop, at next engagement of park, after next restart, etc.)

In further embodiments, time based policies may allow for the temporary enablement of certain vehicle features and/or operational modes for limited periods. For example and without limitation, an autonomous vehicle manufacturer may allow for drivers to selectively purchase certain vehicle software updates that allow for enhanced autonomous operation. Using various time based policy enforcement mechanisms consistent with the disclosed embodiments, a vehicle manufacturer may provision a vehicle with a policy allowing for the enhanced autonomous operation for a limited period to time as a trial before a user purchases the associated software update.

Similarly, a vehicle manufacturer may use various policy enforcement techniques to implement subscription based vehicle feature enablement and/or disablement. For example, using time based policies, a vehicle manufacturer may implement monthly subscriptions to particular vehicle features and/or operating modes that may terminate if the subscription is cancelled.

Component Certification Expiration and/or Recalibration Certificates

Certain vehicle components may have set expiration dates reflective of a maximum safe operating lifespan of a component before it should be replaced and/or refurbished. In these cases, a trusted certificate associated with a component may specify an expiration date and/or time relating to the maximum safe operating lifespan before replacement and/or refurbishment. In some embodiments, the trusted certificate may further specify one or more warning dates before in addition to a final component expiration date.

Certain components may have expiration dates that are related to needs for recalibration and/or recertification. These components may comprise one or more maintenance certificates that specify recertification status and/or recalibration status that may be considered in connection with policy enforcement mechanisms consistent with embodiments disclosed herein. Maintenance certificates may be validated, for example, by verifying that the certificates are signed by a trusted maintenance, certification, and/or recalibration authority. Validly signed policies from a vehicle manufacturer, a component manufacturer, and/or a control system manufacturer may comprise keys and/or certificates that may be used to validate the authenticity of maintenance certificates that may be required by the policy.

Multiple Certificates Associated with Components

In various embodiments, vehicle subsystems and/or associated components may supply one or more certificates comprising, for example and without limitation, component model, manufacturer, and/or serial number information, as well as one or more certificates indicating the date that the component was last replaced, refurbished, certified, calibrated, and/or the like. A master certificate associated with the component may specify a certificate, a hash of a certificate, and/or a key that can be used as a root of trust for determining whether the associated replacement, refurbishment, certification, and/or calibration certificates can be trusted and/or are from a trusted source.

Policy Managed Areas and/or Locations

As vehicles with greater degrees of autonomous driving capabilities become more widely available, certain jurisdictions, areas, and/or locations may require that vehicles operate in only certain modes and/or that only vehicles with certain capabilities may be permitted within a particular area, roadway, and/or system of roads. For example and without limitation, it may be determined by traffic authorities that mixed mode traffic (e.g., traffic with both driver-controlled vehicles and fully autonomous vehicles) may be more prone to accidents that traffic comprising only a single mode (e.g., only vehicles operated in fully autonomous modes).

In some embodiments, it may be determined by traffic management authorities only fully autonomous and/or advanced semi-autonomous vehicle operation is required for a vehicle to operate on a particular section of roadway (e.g., special purpose highway, access-controlled roadways, bridge and/or tunnels, and/or the like). This may allow the authority to safely increase the allowable traffic density and/or speed in a portion of a transportation network that would potentially otherwise not be safe to do so. In at least one non-limiting example, a traffic management authority may require that only vehicles capable of supporting certain automated driving capability levels (e.g., SAE Level 5 autonomous operation) and/or certain automated driving sub-components (e.g., V2V capability, ranging and/or imaging technologies, etc.) are permitted to operate on a roadway. In some embodiments, a policy may be specified requiring that these systems are present, in proper functioning order, have current valid certification and/or calibration certificates, and/or the like, to use a particular portion of a roadway.

In a further non-limiting example, a policy may require that not only must a vehicle be able to validate that it can support certain required features, but it may also need to prove it is capable of remaining at a certain level of autonomous operation (e.g., SAE Level 5 autonomous operation) for the duration of the vehicle's use of a portion of the roadway and/or other transportation infrastructure.

In some embodiments, a vehicle control system may be configured to share and/or otherwise communicate certificate information and/or other trusted credentials associated with the control system and/or various vehicle subsystems and/or components with one or more infrastructure systems and/or elements (e.g., systems and/or elements associated with a particular roadway). For example and without limitation, in response to a query from a toll gate system managing entry into a gated community, a controlled-access roadway system, and/or a system managing ingress to a particular area (e.g., a city's inner urban core), a vehicle may pass certificates, trusted credentials, and/or other digitally signed messages associated with its subsystems and/or components relating to their operating characteristics and/or certifications to the toll gate system (e.g., using V2X communication). If this information is validated and/or otherwise authenticated as conforming to applicable policy requirements, the vehicle may be permitted to proceed and access the controlled area.

In further embodiments, a vehicle control system may receive a supplementary policy from an infrastructure system and/or element specifying conditions of operating the vehicle while in the controlled area. After validating and/or activating the supplemental policy, the vehicle control system may send an acknowledgement message, which may be signed, acknowledging that the policy has been installed and will remain enforced by the vehicle until another associated policy and/or notice is received from a valid authority deactivating and/or superseding the supplemental policy. In at least one non-limiting example, a supplemental policy may specify that a vehicle should remain in an autonomous operating mode and/or engage certain subsystems until the vehicle exits the controlled area and/or subsequently receives a policy and/or notification to deactivate the supplemental policy.

Although various aspects of the foregoing examples and embodiments have been, in certain instances, described in multiple steps, it will also be appreciated that alternative sequences may also be possible within the scope of the inventive body of work. For example and without limitation, a vehicle may receive a supplemental policy from a gating system and/or other associated infrastructure service that specifies one or more of a required operating mode, required minimum capabilities and/or component certifications, and/or the like, along with a confirmation requirement. After the vehicle control system authenticates and validates the supplemental policy, confirms that that the requirements of the policy are satisfied, and engages the vehicle in any required operating mode(s), the vehicle may return a signed confirmation message indicating that the vehicle is in conformance with the supplemental policy.

Upon-receiving a validity signed confirmation from the vehicle and/or otherwise determining that the vehicle control system is trusted, the infrastructure system associated with the gate may grant the vehicle access to the roadway and/or controlled area. Similarly, upon exiting the roadway and/or controlled area, the vehicle control system may receive a revocation message associated with the policy, and/or an updated policy that supersedes and/or deactivates the previously instantiated supplemental policy, and the previously specified restrictions or conditions for operation will no longer apply. In such a manner, as technology improves over time, many different configurations of self-driving vehicles, potentially with increased levels of safety and capability, may be produced and allowed to share the transportation infrastructure. Certain areas and/or roadways, however, may be designated where only vehicles meeting certain criteria and/or capabilities (potentially higher standards of performance and/or safety) are permitted to operate and/or such advanced functionality is required to be engaged during operation.

In some embodiments, vehicle control systems may be configured to interpret several policies concurrently and apply an algorithm to engage a safe combination of policies. For example and without limitation, in connection with the example above, a vehicle control system may first apply a manufacturer policy dictating criteria for safe operation of certain vehicle autonomous driving capabilities and determine that certain autonomous driving features are not permitted to be engaged. In response to receiving supplemental policy from an infrastructure system specifying minimum requirements for operation of a particular feature in a particular area, a vehicle control system may determine that the manufacturer restriction on use would prevent the vehicle to enter a particular driving mode despite being otherwise permitted by the supplemental policy. In some embodiments, the vehicle control system may be configured to apply the most restrictive combination of requirements as a mechanism to ensure the maximum operational safety.

Vehicle Policy Enforcement Processes

Figure 3:
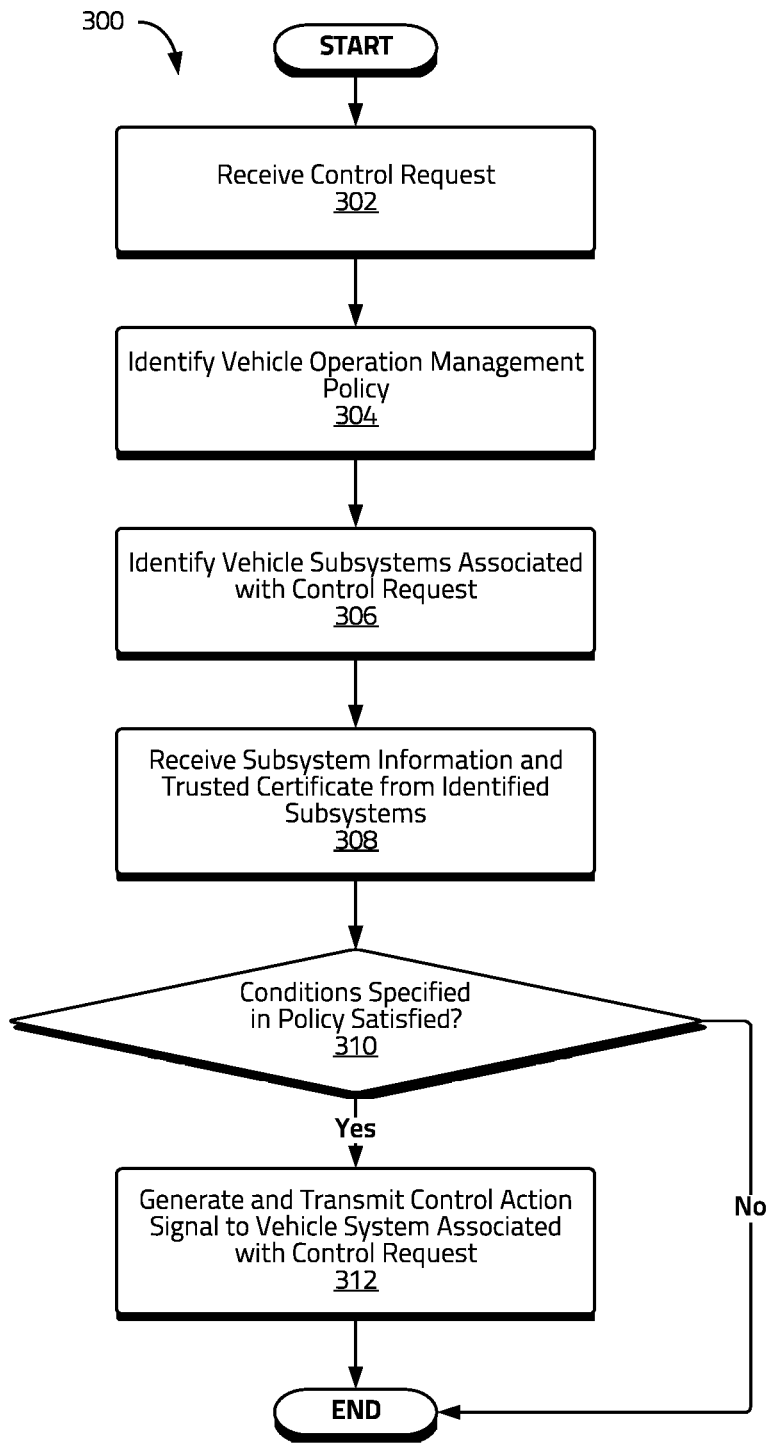
FIG. 3 illustrates a flow chart of an example of a method of managing vehicle operations in accordance with enforced policy consistent with certain embodiments of the present disclosure.

FIG. 3 illustrates a flow chart of an example of a method 300 of managing vehicle operations in accordance with enforced policy consistent with certain embodiments of the present disclosure. The illustrated method 300 and/or aspects thereof may be performed by and/or in conjunction with software, hardware, firmware, and/or any combination thereof. In various embodiments, the method 300 may be performed by a vehicle control system configured to manage one or more vehicle operations and/or functions in accordance with one or more articulated policies consistent with certain aspects of the disclosed systems and methods.

At 302, a control request may be received by a vehicle control system for an associated vehicle to engage in at least one controlled operation. The controlled operation may comprise, for example and without limitation, an autonomous operation, a semi-autonomous operation, a driver-assist operation, entering an associated operational mode, and/or the like At least one vehicle operation management policy stored by the vehicle control system may be identified based, at least in part, on the received control request at 304. For example, in some embodiments, various control requests and/or associated control actions may be associated with and/or otherwise identified in one or more vehicle management policies. In some embodiments, vehicle operation management policies may be received from a policy service in connection with the vehicle and/or the vehicle control system.

In some embodiments, a vehicle operation management policy may be validated and/or authenticated by the vehicle control system prior to enforcement as part of method 300. In certain embodiments, the vehicle control system may interact with one or more validation and/or authentication services as part of the validation and/or authentication process. In further embodiments, the vehicle control system may be configured to validate and/or authenticate a vehicle operation management policy itself. In some embodiments, a vehicle operation management policy may be encrypted and/or otherwise protected, allowing for access and/or enforcement of the policy by authorized control systems and/or other systems possessing certain cryptographic keys and/or other credentials.

In various embodiments, keys associated with validating, authenticating, and/or decrypting secure policies may be stored in a secure processing environment (e.g., a trusted execution environment) and/or secure processing hardware (e.g., an SPU) associated with the vehicle control system. In further embodiments, key validation, authentication, and/or decrypting processes may be performed within a secure processing environment and/or secure processing hardware of the vehicle control system.

At 306, one or more vehicle subsystems associated with the at least one controlled operation specified in the control request may be identified. A variety of vehicle subsystems may be identified in connection with various disclosed embodiments. For example, in some embodiments, the one or more vehicle subsystems may comprise one or more sensor systems comprising any of the types of sensor systems described herein.

The control system may receive subsystem information and at least one first trusted certificate from at least one of the one or more vehicle subsystems at 308. The subsystem information may comprise, for example and without limitation, sensor information, although other types of subsystem information are also contemplated.

In further embodiments, the at least one first trusted certificate may comprise information relating to at least one characteristic of an associated subsystem (e.g., subsystem identification information, manufacturer information, model information, serial number information, software version information, and/or the like).

At 310, it may be determined, based at least in part on the subsystem information and the at least one first trusted certificate, whether one or more conditions specified in the vehicle management policy have been satisfied. In some embodiments, the conditions may be associated with the at least one characteristic of an associated subsystem. In some embodiments, the authenticity of the first trusted certificate may be verified with a trusted service provider system as part of policy enforcement processes.

In further embodiments, the conditions may specify at least one threshold associated with received subsystem information. Determining whether the conditions of the policy have been satisfied may comprise comparing the received subsystem information with the at least one threshold.

In some embodiments, at least one cryptographic signature associated with the received subsystem information may be received by the vehicle control system. In some embodiments, the signature may comprise a signature over at least a portion of the received subsystem information. The cryptographic signature may be verified to determine that the signature was generated using a private key securely associated with the subsystem. In various embodiments, signature verification operations may involve interaction with a signature verification service.

The method 300 may further include receiving at least one second trusted certificate from a device associated with a driver of the vehicle (e.g., a dongle and/or smartphone device). The second trusted certificate may comprise, for example and without limitation, an indication of an authority of the driver to engage in the at least one controlled operation. In some embodiments, the validity second trusted certificate may be verified by interacting with a trusted authority. Consistent with embodiments disclosed herein, determining whether the one or more conditions specified in the policy have been satisfied may be further based, at least in part, on the at least one second trusted certificate.

At 312, one or more control action signals may be generated based at least in part, on the policy determination. For example and without limitation, the control action signals may comprise at least one signal allowing the vehicle to operate in a particular operating mode (e.g., an autonomous operating mode and/or the like). The vehicle control system may transmit the control action signal to at least one vehicle system associated with the controlled operation.

Figure 4:
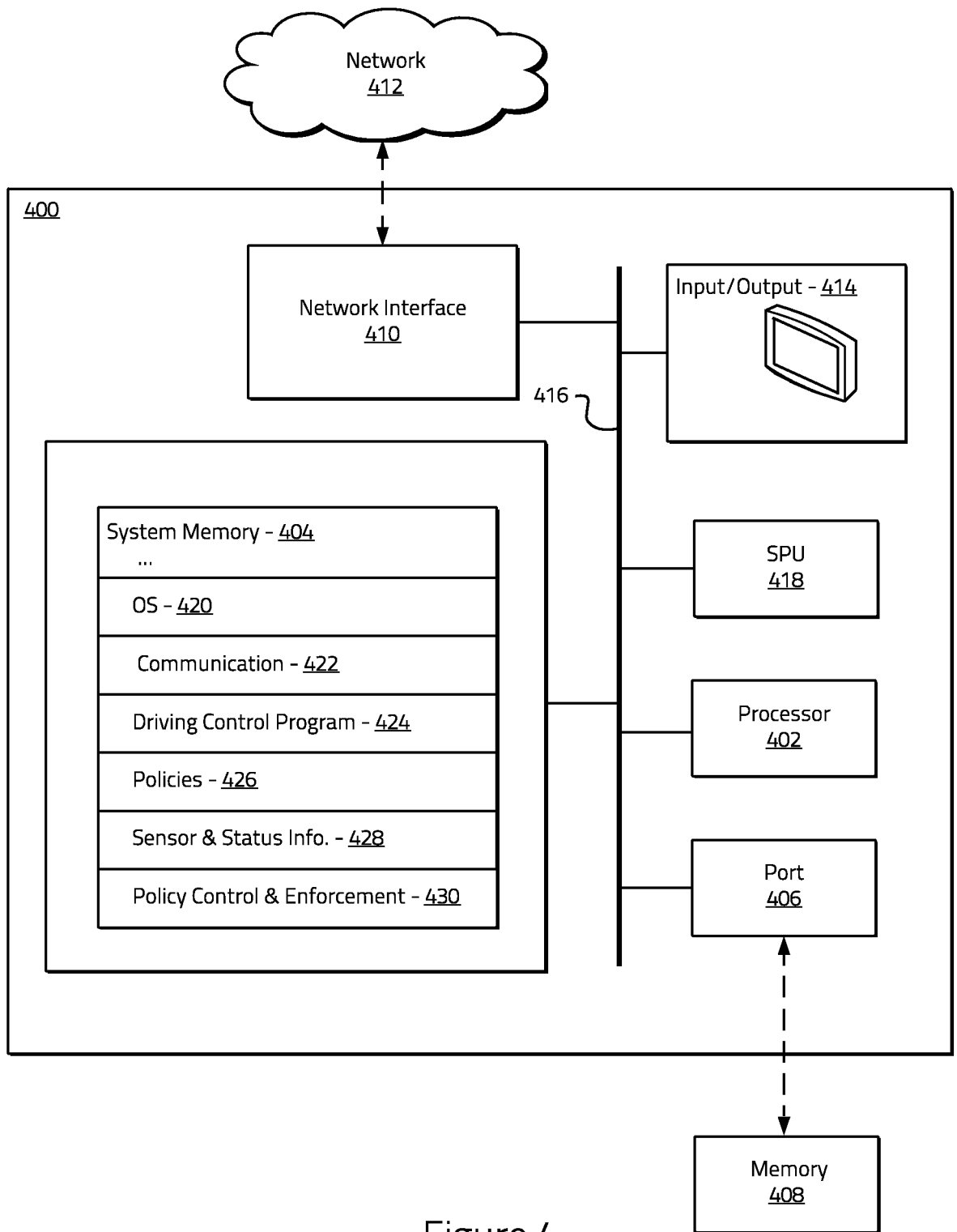
FIG. 4 illustrates an example of a system that may be used to implement certain embodiments of the systems and methods of the present disclosure.

FIG. 4 illustrates a system 400 that may be used to implement certain embodiments of the systems and methods of the present disclosure. In some embodiments, a vehicle control system, system, and/or a subsystem associated with a vehicle, policy service, user and/or driver devices, and/or other services, and/or any other system configured to implement embodiments of the disclosed systems and methods and/or aspects thereof may include some and/or all of the elements of the illustrated system 400. In certain embodiments, the system 400 may include components that may be included in a vehicle control system configured to engage in policy determinations in connection with managing vehicle control actions consistent with certain embodiments disclosed herein.

Various systems, subsystems, devices, and/or services used in connection with various aspects of the disclosed embodiments may comprise a variety of computing devices and/or systems, including any computing system or systems suitable to implement the systems and methods disclosed herein. For example, the various systems, subsystems, devices, and/or services may comprise a variety of computing devices and systems, including sensors, vehicle subsystems, microcontrollers, control modules, vehicle control systems, and/or the like.

As illustrated in FIG. 4, the system 400 may include: a processing unit 402; system memory 404, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 402; a port 406 for interfacing with removable memory 408 that may include one or more diskettes, optical storage mediums (e.g., flash memory, thumb drives, USB dongles, compact discs, DVDs, etc.) and/or other non-transitory computer-readable storage mediums; a network interface 410 for communicating with other systems via one or more network connections 412 using one or more communication technologies; a user interface 414 that may include a display and/or one or more input/output devices such as, for example, a touchscreen, a keyboard, a mouse, a track pad, and the like; and one or more busses 416 for communicatively coupling the elements of the system 400.

In some embodiments, the system 400 may, alternatively or in addition, include an SPU 418, and/or another trusted and/or otherwise secure execution environment that is protected from tampering by a user of the system 400 or other entities by utilizing secure physical and/or virtual security techniques. An SPU 418 and/or other trusted and/or otherwise secure processing and/or execution environment can help enhance the security of sensitive operations such as personal information management, trusted credential and/or key management, privacy and policy management, and other aspects of the systems and methods disclosed herein. In certain embodiments, the SPU 418 and/or other trusted and/or otherwise secure environment may operate in a logically secure processing domain and be configured to protect and operate on secret information, as described herein. In some embodiments, the SPU 418 and/or other trusted and/or otherwise secure environment may include internal memory storing executable instructions or programs configured to enable the SPU 418 and/or other trusted and/or otherwise secure environment to perform secure operations, as described herein.

The operation of the system may be generally controlled by a processing unit 402 and/or an SPU 418, and/or other trusted and/or otherwise secure operating environment by executing software instructions and programs stored in the system memory 404 (and/or other computer-readable media, such as removable memory 408). The system memory 404 may store a variety of executable programs or modules for controlling the operation of the system. For example, the system memory 404 may include an OS 420 that may manage and coordinate, at least in part, system hardware resources and provide for common services for execution of various applications. The system memory may further include, without limitation, communication software 422 configured to enable in part communication with and by the system, a driving control program 424, vehicle operation management policies 426, subsystem sensor and/or status information 428, a policy control and/or enforcement module 430 configured to perform various policy enforcement operations consistent with various aspects of the disclosed embodiments, and/or any other information, modules, and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a magnetic disk, flash memory, integrated circuits, and/or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, devices, services, and/or components presented in connection with the figures and/or associated description within the scope of the inventive body of work, and that the examples presented in the figures are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for managing at least one controlled operation of a vehicle performed by a vehicle control system comprising a processor and a non-transitory computer readable storage medium storing instructions that, when executed by the processor, cause the vehicle control system to perform the method, the method comprising:
receiving a control request for the vehicle to engage in the at least one controlled operation;
identifying, based at least in part on the control request, at least one vehicle operation management policy stored by the vehicle control system, the at least one vehicle management policy identifying one or more vehicle subsystems included in the vehicle associated with the at least one controlled operation and specifying one or more conditions associated with the at least one controlled operation;

receiving subsystem information and at least one first trusted certificate from at least one of the one or more vehicle subsystems, the at least one first trusted certificate comprising information relating to at least one characteristic of an associated subsystem;

determining, based at least in part on the subsystem information and the at least one first trusted certificate, whether the one or more conditions specified in the vehicle operation management policy have been satisfied;

generating, in accordance with the determination, a control action signal; and transmitting the control action signal to at least one vehicle system associated with the at least one controlled operation.

2. The method of claim 1, wherein the at least one controlled operation comprises at least one of an autonomous operation, a semi-autonomous operation, and a driver-assist operation.

3. The method of claim 1, wherein the method further comprises receiving the at least one vehicle operation management policy from a policy service in communication with the vehicle control system.

4. The method of claim 1, wherein the one or more vehicle subsystems comprise at least one sensor system.

5. The method of claim 4, wherein the subsystem information comprises sensor information generated by the at least one sensor system.

6. The method of claim 1, wherein the information relating to the at least one characteristic of the associated subsystem comprises at least one of subsystem identification information, subsystem manufacturer information, subsystem model information, subsystem serial number information, and subsystem software version information.

7. The method of claim 6, wherein the one or more conditions specified in the vehicle operation management policy comprise at least one condition relating to at least one characteristic of the associated subsystem.

8. The method of claim 7, wherein the one or more conditions further specify at least one threshold associated with the received subsystem information.

9. The method of claim 8, wherein determining whether the one or more conditions have been satisfied comprises comparing the received subsystem information with the at least one threshold.

10. The method of claim 1, wherein the method further comprises verifying authenticity of the at least one first trusted certificate with a trusted service provider system.

11. The method of claim 1, wherein the method further comprises receiving at least one cryptographic signature associated with the received subsystem information.

12. The method of claim 11, wherein the method further comprises verifying that the at least one cryptographic signature was generated using a private key securely associated with the at least one subsystem.

13. The method of claim 1, wherein the method further comprises receiving at least one second trusted certificate from a device associated with a driver of the vehicle.

14. The method of claim 13, wherein the at least one second trusted certificate comprises an indication of an authority of the driver to engage in the at least one controlled operation.

15. The method of claim 13, wherein determining whether the one or more conditions specified in the vehicle operation management policy have been satisfied is further based, at least in part, on the at least one second trusted certificate.

* * * * *